US009392754B1

(12) United States Patent
Summers et al.

(10) Patent No.: US 9,392,754 B1
(45) Date of Patent: Jul. 19, 2016

(54) DRIVE UNIT

(71) Applicant: Valmont Industries, Inc., Omaha, NE (US)

(72) Inventors: James Summers, West Point, NE (US); Tyler Fraser, West Point, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 14/575,679

(22) Filed: Dec. 18, 2014

Related U.S. Application Data

(60) Provisional application No. 61/917,744, filed on Dec. 18, 2013.

(51) Int. Cl.
*A01G 25/09* (2006.01)
*B05B 1/20* (2006.01)
*B62D 7/15* (2006.01)

(52) U.S. Cl.
CPC .............. *A01G 25/09* (2013.01); *A01G 25/092* (2013.01); *B05B 1/20* (2013.01); *B62D 7/159* (2013.01); *B62D 7/1572* (2013.01)

(58) Field of Classification Search
CPC ......... A01G 25/09; A01G 25/092; B05B 1/20
See application file for complete search history.

(56) References Cited

U.S. PATENT DOCUMENTS

| | | | | |
|---|---|---|---|---|
| 4,190,068 A | * | 2/1980 | Beusch et al. | 137/1 |
| 4,371,116 A | * | 2/1983 | Sage et al. | 239/731 |
| 4,432,494 A | * | 2/1984 | Hunter | 239/729 |
| 4,609,147 A | * | 9/1986 | Chapman et al. | 239/735 |
| 2014/0371971 A1 | * | 12/2014 | Welch | 701/23 |

* cited by examiner

*Primary Examiner* — Ryan Reis
(74) *Attorney, Agent, or Firm* — Milligan PC LLO

(57) ABSTRACT

A drive unit for an irrigation system comprising, a pair of vertical tower members, a base beam, a pair of drive wheels, a sensor, a hydraulic unit and a pair of connecting rods. A pair of drive wheels each is pivotally connected to the front end and the back end of the base beam. Each of the pair of drive wheels are operably connected to a gearbox and a motor. An electrically controlled hydraulic unit is coupled with the sensor and includes a pair of pistons for pulling or pushing the connecting rods. The sensor mounted on the pipeline detects the stress on the pipeline and activates the hydraulic unit. When a change in stress is detected in the pipeline of the irrigation system, the sensor triggers the hydraulic unit that pulls or pushes the connecting rods to turn the drive wheels and to reduce the stress on the span of the irrigation system.

1 Claim, 2 Drawing Sheets

DRIVE UNIT

RELATED APPLICATIONS

The present application claims priority to U.S. Provisional Application No. 61/917,744 filed Dec. 18, 2013.

BACKGROUND OF THE DISCLOSURE

1. Technical Field of the Disclosure

The present invention is related in general to the field of drive units and, more particularly, to irrigation drive units that can detect a change in stress and can turn the wheels of the irrigation systems to eliminate the stress.

2. Description of the Related Art

Conventional irrigation systems include a corner pivot irrigation system, a center pivot irrigation system or a linear move irrigation system. These irrigation systems include a series of interconnected irrigator spans having conduits for conveying fluid to an agricultural field. Such irrigation systems typically include a water delivery pipeline which is supported by a plurality of structural steel towers or drive units. The steel towers or drive units provide support to the main water supply pipe above the ground, and are driven at slow speeds to move the tower or drive unit in a circular path about the central pivot, or in a linear path in the case of linear move systems, over the field to be irrigated. Each of the steel towers or drive units has spaced apart drive wheels which are driven by any convenient means such as an electric motor which is connected to a gearbox at each end of the main beam of the towers or drive units. The towers or drive units usually have at least two wheel/tire assemblies associated therewith which contact the ground and support a substantial percentage of the total weight of the system. However conventional irrigation systems have considerable drawbacks. In such irrigation systems, the drive wheels can only move in a straight forward alignment. Drive wheels which are aligned in a straight forward configuration can cause a change of arching on a truss span resulting in increased stress on the pipeline.

For example, a drive unit for a self-propelled irrigation system may include an elongated pipeline supported upon a plurality of spaced-apart drive units. A first drive assembly and a second drive assembly may be pivotally connected to a base beam having a first end and a second end thereof. Each of the first and the second drive assemblies may include an elongated support member pivotally connected, about a generally vertical axis, which is generally transverse to the longitudinal axis of the base beam, to the base beam adjacent the first end thereof. First and second driven wheels may be rotatably mounted on the elongated support member adjacent the ends thereof. The drive wheels are driven by an electric motor and gearbox arrangement. However, the drive unit is cumbersome and creates arching or pulling on the truss span due to the heavy load as the drive wheels move through the field. The drive unit cannot detect a change in the stress on the span and is unable to provide proper alignment of the drive wheels to eliminate the stress on the span.

Another existing system discloses an irrigation system with a corner irrigator span comprising a main irrigation portion having an end irrigator span. A control system controls the movement of the corner irrigator span. The control system includes a linear movement control system to control a corner drive unit of the corner irrigator span and a steering control system that controls a steering unit of the corner irrigator span. A disadvantage of this system is that the steering control system only provides steering to the corner irrigator span but does not allow turning of the drive wheels. In this system the drive wheels are arranged in a straight forward alignment that allows only linear movement of the drive wheels.

Recent advancements in the art provide a self-propelled irrigation machine including an elongated main boom pivoted at one end to a center pivot and supported on a plurality of self-propelled, non-steerable drive towers. An extension boom is pivotally secured to the other end of the main boom for irrigating corner areas of the field. A steerable drive tower supports the extension boom and includes a pair of steerable drive wheels. The guidance and control for the extension boom utilizes GPS receivers as position sensors. The system is comprised of two GPS units, two microprocessor-based smart boxes, a communications link running from the pivot to the steerable drive unit, and an angle sensor to monitor the angle of the corner arm steerable wheels. However, the system has a complex structure and the GPS units and communications link running from the pivot to the steerable drive unit may be subject to error based on the inconsistent motion of the drive wheels to which they are attached. This error and inconsistent motion causes crowning or arching of the span of the irrigation system.

Based on the foregoing, there is a need for a drive unit which would allow steering of the drive wheels to allow specific circular or linear movement of the drive wheels. Such a needed system would detect a change in the stress on the span and provide proper alignment of the drive wheel to eliminate the stress. Such a needed system would reduce the effect of load on the system and reduce metal and system fatigue from the load on the system. Such a needed system would be simple in construction and would also be steered to realign spans for storage configuration in a field and to provide specific irrigation patterns. The present invention overcomes prior art shortcomings by accomplishing these critical objectives.

SUMMARY OF THE DISCLOSURE

To minimize the limitations found in the prior art, and to minimize other limitations that will be apparent upon the reading of the specifications, the preferred embodiment of the present invention provides a drive unit that can detect a change in stress and can turn the wheels of the irrigation systems to eliminate the stress.

The present embodiment discloses a drive unit for an irrigation system comprising, a pair of vertical tower members, a base beam, a pair of drive wheels, a sensor, a hydraulic unit and a pair of connecting rods. The pair of vertical tower members each has a top end and a bottom end, the top end is attached to the pipeline of the irrigation system. The base beam has a front end and a back end connected horizontally between the bottom ends of the pair of vertical tower members. A pair of drive wheels each is pivotally connected to the front end and the back end of the base beam. Each of the pair of drive wheels are operably connected to a gearbox and a motor. The pair of connecting rods is connected between the gear box and the hydraulic unit for turning the drive wheels by means of a plurality of connecting means. An electrically controlled hydraulic unit is coupled with the sensor and includes a pair of pistons for pulling or pushing the connecting rods. The sensor mounted on the pipeline detects the stress on the pipeline and activates the hydraulic unit. When a change in stress is detected in the pipeline of the irrigation system, the sensor triggers the hydraulic unit that pulls or pushes the connecting rods to turn the drive wheels and to reduce the stress on the span of the irrigation system.

In accordance with one embodiment of the present invention, when a change in arch in the span is detected by the sensor, the sensor triggers the hydraulic unit. When compression stress or arching stress is detected by the sensor, the hydraulic unit pushes the connecting rods to turn the wheels and steer the drive unit away from the initial position and reduce the stress on the span.

In accordance with another embodiment of the present invention, when a tension or under-arching stress is detected by the sensor, the hydraulic unit pulls the connecting rods to turn the wheels and steer the drive unit toward the initial position. This steering toward the initial position alleviates the under-arching or tension on the span and mitigates stress on the span.

In accordance with yet another embodiment of the present invention, the drive wheels could also be turned to steer around geographic obstacles or features in a field. The drive wheels could also be steered to provide specific circular or linear alignment in a field to provide specific irrigation patterns. The wheels could also be steered to realign spans for storage configuration in a field. Other exemplary embodiments provide a drive unit that would eliminate the need for an anchor at the pivot point and reduces the amount of material used or the size of the structure utilized to resist the forces in a standard wheel alignment system. Yet another embodiment of the present invention provides a drive unit that reduces the load on the span of the irrigation system and reduces metal and system fatigue from the load on the system.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
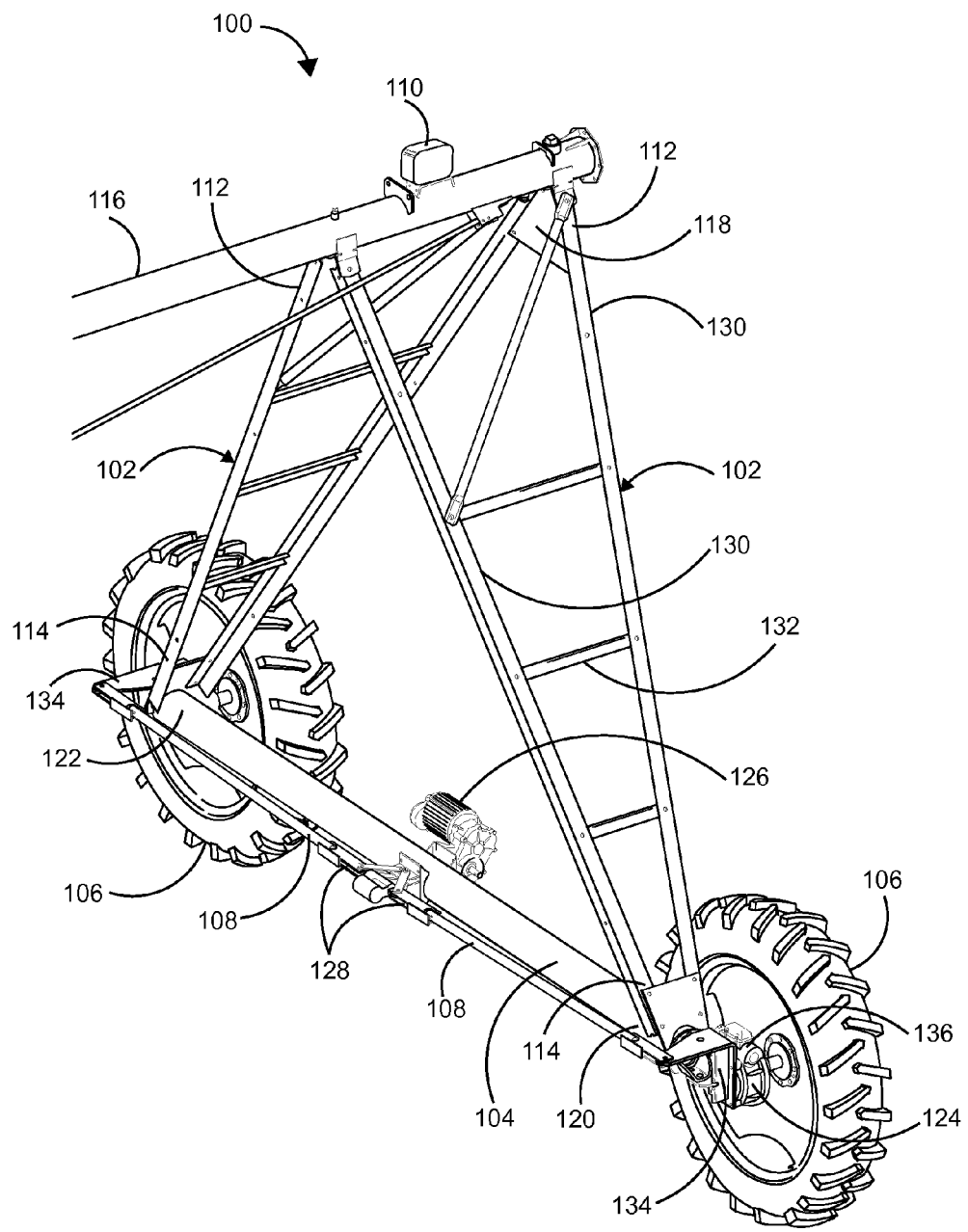
FIG. 1 illustrates a perspective view of a preferred embodiment of a drive unit for an irrigation system of the present invention.

FIG. 1 illustrates a perspective view of a preferred embodiment of a drive unit 100 for an irrigation system. The drive unit 100 is designed to be installed for a self-propelled irrigation system such as a lateral move irrigation system, a center pivot irrigation system, or a corner irrigation system. The drive unit 100 for the irrigation system comprises a pair of vertical tower members 102, a base beam 104, a pair of drive wheels 106, a sensor 110, a hydraulic unit 126 and a pair of connecting rods 108. The pair of vertical tower members 102 each has a top end 112 and a bottom end 114. The top end 112 is attached to the pipeline 116 of the irrigation system by means of a plurality of connecting means 118. The plurality of connecting means 118 may be selected from a group consisting of: bracket assembly, screws and nuts. The pair of vertical tower members 102 extends downwardly and outwardly from the pipeline 116. The pair of vertical tower members 102 supports the pipeline 116 of the irrigation system and each of the vertical tower members 102 includes a pair of elongated bars 130 connected together by means of a plurality of horizontal rods 132. The base beam 104 has a front end 120 and a back end 122 connected horizontally between the bottom ends 114 of the pair of vertical tower members 102. The pair of drive wheels 106 each being pivotally connected to the front end 120 and the back end 122 of the base beam 104 by means of a plurality of attachment means 134. The plurality of attachment means 134 may be selected from a group consisting of: bracket assembly and pins. Each of the pair of drive wheels 106 are operably connected to a gearbox 124 and a motor 136. The sensor 110 is mounted on the pipeline 116 to detect the stress on the pipeline 116. A stress sensor may be utilized to determine the stress and/or alignment of the span of the irrigation system. The hydraulic unit 126 may be controlled electrically and is coupled with the sensor 110 and includes a pair of pistons 128 for adjusting the length of the connecting rods 108. The pair of pistons 128 hydraulically extend/retract to push/pull the connecting rods 108. The pair of connecting rods 108 is operably connected to the drive wheels 106 and the hydraulic unit 126 for turning the drive wheels 106 by means of a plurality of attachment means 134. When a change in stress is detected in the pipeline 116 of the irrigation system, the sensor 110 triggers the hydraulic unit 126 that adjusts the configuration of the pair of connecting rods 108 to turn the drive wheels 106 and to reduce the stress on the span of the irrigation system. The pair of drive wheels 106 can be pivotably rotated to turn the drive unit 100 into/away from the anchor point or initial tower of the irrigation system. The pushing/pulling of the pair of connecting rods 108 changes the alignment of the drive wheels 106 and alleviates arching or pulling on the span that normally occurs as a standard irrigation system moves through a field.

Figure 2:
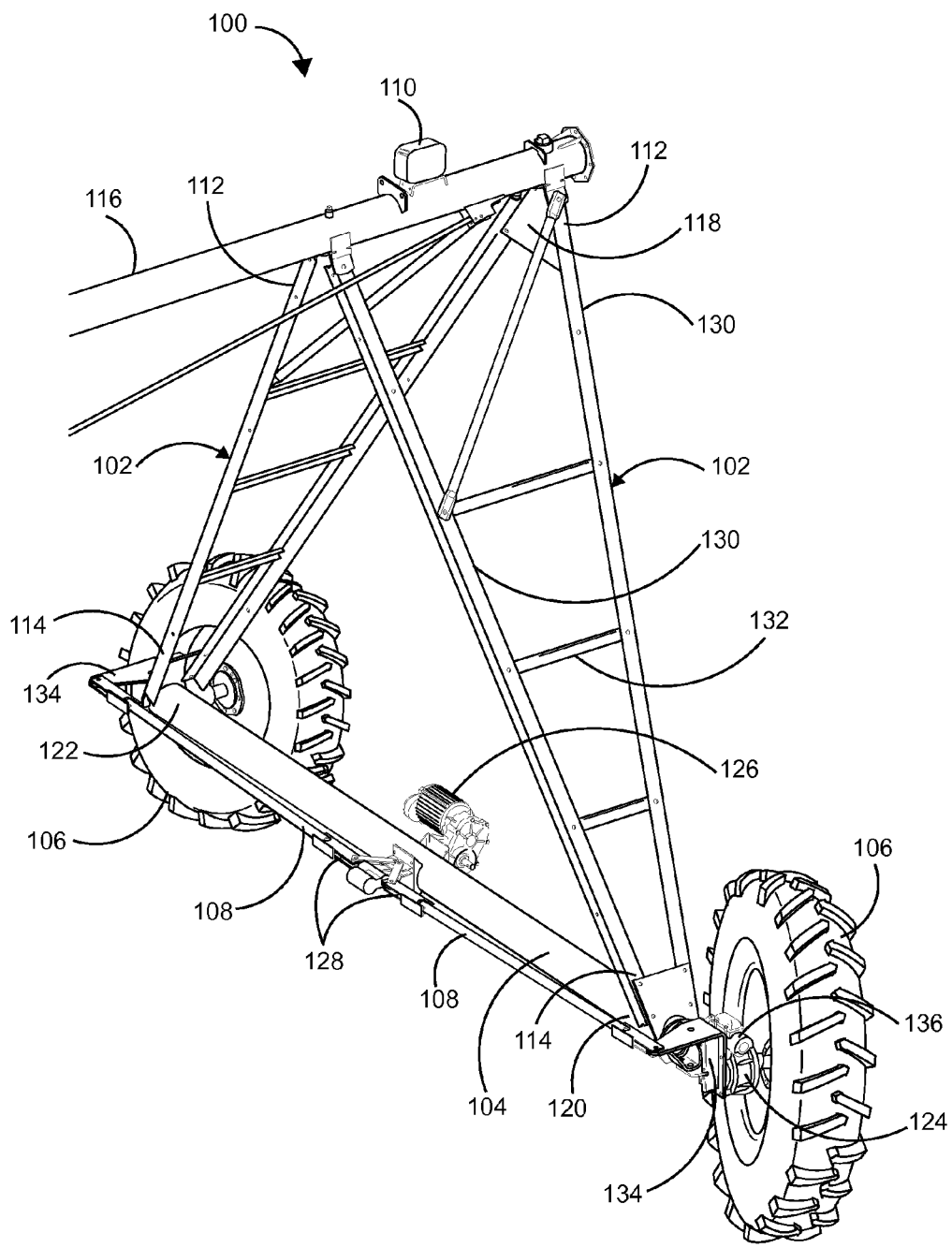
FIG. 2 illustrates a perspective view of the outward alignment of the pair of drive wheels by the extended pair of connecting rods of the drive unit of the present invention mounted on the pipeline of an irrigation system.

FIG. 2 illustrates a perspective view of the outward alignment of a pair of drive wheels 106 by the extended pair of connecting rods 108 of the drive unit 100 of the present invention mounted on the pipeline 116 of an irrigation system. The sensor 110 detects a change in stress and misalignment of the span of the irrigation system. A stress sensor may be utilized to determine the stress and alignment of the span of the irrigation system. The stress on the span may be due to the misalignment of spans in the standard irrigation system. The stress may also be caused by fluid in the span which increases the mass of the span and may result in new compressive forces. The crowning/arching of the span may occur depending on whether the span is full of water, partially full or empty. When a change in arch in the span is detected by the sensor 110, the sensor 110 triggers the hydraulic unit 126. When compression stress or arching stress is detected by the sensor 110, the hydraulic unit 126 pushes the connecting rods 108 to turn the drive wheels 106 and steer the drive unit 100 away from the initial position and reduce the stress on the span. When arching occurs the pair of pistons 128 extends thereby pushing the pair of connecting rods 108 outward. This causes the pair of drive wheels 106 to turn to an outward radius and reduce arching in the span. When a tension or under-arching stress is detected by the sensor 110, the hydraulic unit 126 pulls the pair of connecting rods 108 to turn the drive wheels 106 and steer the drive unit 100 toward the initial position. This steering toward the initial position alleviates the under-arching or tension on the span and mitigates stress on the span. When a tension or under-arching stress is detected by the sensor 110, the pair of pistons 128 is retracted, thereby pulling the pair of connecting rods 108. This causes the pair of drive wheels 106 to turn to an inward radius and increase arching in the span. The drive unit 100 thus limits the loads transferred and reduces stress on the span.

Other alignment guidance systems like a buried wire in the field, or a Global Positioning System (GPS) unit may also be utilized, to provide alignment information of the span of the irrigation system. The drive unit 100 can steer the drive wheels 106 to stay over a buried wire and provide proper alignment to the drive wheels. The GPS unit may also be utilized to detect misalignment. The drive unit 100 can steer the drive wheels 106 to bring the irrigation system back into alignment depending on GPS coordinates.

The drive unit 100 also enables the drive wheels 106 to be turned to steer around geographic obstacles or features in a field. The drive wheels 106 could also be steered to provide specific circular/linear alignment in the field to provide specific irrigation patterns. The drive wheels 106 could also be steered to realign spans of the irrigation system for storage configuration in the field.

What is claimed is:

1. A drive unit for an irrigation system comprising:
   a pair of vertical tower members each having a top end and a bottom end, the top end being attached to pipeline of the irrigation system;
   a base beam having a front end and a back end connected horizontally between the bottom end of the pair of vertical tower members by means of a plurality of connecting means;
   a front drive wheel being pivotally connected to the front end of the base beam and a rear drive wheel being pivotally connected to the back end of the base beam, wherein the front drive wheel is operatively connected to a front gearbox and a front motor; further wherein the rear drive wheel is operatively connected to a rear gearbox and a rear motor;
   a sensor mounted on the span of the pipeline configured for detecting the stress on the pipeline;
   a hydraulic unit operably coupled with the sensor; wherein the hydraulic unit is operatively connected to the front drive wheel via a front piston and a front connecting rod; further wherein the hydraulic unit is operatively connected to the rear drive wheel via a rear piston and a rear connecting rod;
   whereby the sensor triggers the hydraulic unit when a change in stress is detected, thereby adjusting the length of the front and rear connecting rods to respectively turn the front and rear drive wheels and to reduce the stress on the span of the irrigation system.

* * * * *